United States Patent [19]

Penzotti et al.

[11] Patent Number: 5,374,077
[45] Date of Patent: Dec. 20, 1994

[54] PNEUMATICALLY DAMPED VEHICLE SUSPENSION SYSTEM

[75] Inventors: Roger P. Penzotti, Mount Vernon; Donald L. Stephens, LaConner, both of Wash.

[73] Assignee: Paccar Inc., Bellevue, Wash.

[21] Appl. No.: 2,601

[22] Filed: Jan. 11, 1993

[51] Int. Cl.5 .............................................. B60G 11/30
[52] U.S. Cl. ..................................... 280/711; 280/714; 267/64.17; 267/64.27; 267/64.28; 267/123
[58] Field of Search ....................... 280/714, 711, 6.12, 280/689, 772, 702; 267/64.17, 64.19, 64.25, 64.27, 64.28, 122, 123

[56] References Cited

U.S. PATENT DOCUMENTS

| | | | |
|---|---|---|---|
| 2,773,686 | 12/1956 | Nash | 267/64.27 |
| 2,862,725 | 12/1958 | Jackson . | |
| 3,002,764 | 10/1961 | Clark, Sr. . | |
| 3,007,712 | 11/1961 | Moulton et al. . | |
| 3,050,316 | 8/1962 | Behles . | |
| 3,487,417 | 12/1969 | Morgan | 267/64.27 |
| 3,674,282 | 7/1972 | Stoklasek . | |
| 3,829,118 | 8/1974 | Gouirand | 280/711 |
| 4,084,667 | 4/1978 | Kurrat | 188/275 |
| 4,165,066 | 8/1979 | Horvat | 267/65 |
| 4,174,855 | 11/1979 | Vandenberg | 280/711 |
| 4,295,660 | 10/1981 | Toti et al. | 280/714 |
| 4,313,529 | 2/1982 | Kato et al. | 188/299 |
| 4,379,572 | 4/1983 | Hedenberg | 280/711 |
| 4,478,431 | 10/1984 | Muller et al. | 280/714 |
| 4,497,505 | 2/1985 | Harrison et al. | 280/698 |
| 4,504,079 | 3/1985 | Strong | 280/683 |
| 4,834,418 | 5/1989 | Buma et al. | 280/707 |
| 4,856,812 | 8/1989 | Stephens et al. | 280/678 |
| 5,046,752 | 9/1991 | Stephens et al. | 280/678 |

FOREIGN PATENT DOCUMENTS

| | | |
|---|---|---|
| 0462510A2 | 6/1991 | European Pat. Off. . |
| 654223 | 5/1963 | Italy .................................. 280/711 |
| 61-81214 | 4/1986 | Japan . |
| 890822 | 3/1962 | United Kingdom . |
| 895996 | 5/1962 | United Kingdom . |
| 917521 | 2/1963 | United Kingdom . |

*Primary Examiner*—Karin L. Tyson
*Attorney, Agent, or Firm*—Seed and Berry

[57] ABSTRACT

A pneumatically damped vehicle suspension system. The suspension system provides damping which is load-dependent, i.e., the amount of damping varies in approximate proportion to the load supported by the suspension system, thereby maintaining a nearly constant fraction of critical damping over the normal range of operating loads. The damping provided by the system is also frequency-dependent, a characteristic not achievable with hydraulic dampers. Two independent damping circuits provide maximum damping at the suspension's two resonant frequencies, or modes of vibration—the bounce mode and the axlehop mode. Relatively little damping is provided at other frequencies, resulting in improved isolation of road inputs.

19 Claims, 7 Drawing Sheets

PNEUMATICALLY DAMPED VEHICLE SUSPENSION SYSTEM

TECHNICAL FIELD

The present invention relates to vehicle suspension systems and, more particularly, to pneumatic damping for a tandem-axle vehicle suspension system,

BACKGROUND OF THE INVENTION

Vehicle suspensions which employ pneumatic springs, such as airsprings, as the load-supporting elements are widely used on modern heavy-duty highway trucks and trailers. In addition to being relatively light compared to other types of springs, the stiffness of an airspring varies nearly in proportion to the load being carried. Hence, the natural frequency of an air suspension varies little with changes in load, allowing the suspension to provide a soft ride under a wide range of loads. Airsprings also permit the static height of the suspension to be maintained, independent of the load, through the use of a height control valve. The height control valve senses the position of the suspension and supplies or exhausts air from the airspring as required to maintain a constant ride height. These are particularly desirable features for large trucks since the load supported by the suspension can change significantly between the/fully loaded and lightly loaded conditions.

One characteristic of airsprings is that they have little inherent damping. As a result, suspensions which employ them are normally equipped with secondary damping devices, such as hydraulic "shock absorbers."

Figure 1:
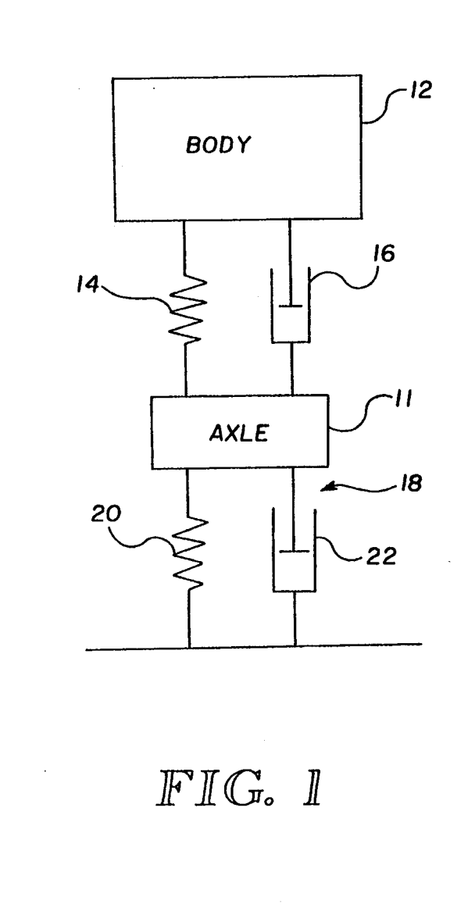
FIG. 1 is a two-degree-of-freedom quarter car representation of a prior art vehicle suspension system.

FIG. 1 is a schematic representation of a typical motor vehicle suspension system 10. A so-called "quarter-car" representation is shown corresponding to the suspension elements associated with one end of an axle 11. The vehicle body 12 is normally supported by a suspension spring 14 interposed in some manner between the axle and the body. A suspension damper 16, usually a hydraulic shock absorber, is also interposed between the axle and the body. Likewise, the axle is supported by the tire 18, which in effect is a spring 20 and a damper 22. The various linkages and attachments which locate these components are not relevant to the ensuing discussion and therefore are not shown.

The system 10 represented in FIG. 1 is a two-degree-of-freedom system since it has two discrete masses (the body 12 and axle 11) and therefore two natural frequencies (modes) of vibration. The lower frequency is referred to as the suspension bounce frequency and is characterized by the in-phase movement of the body 12 and the axle 11. For the stiffnesses and masses typical to cars and trucks, the bounce frequency is largely governed by the body mass and the suspension spring stiffness, the axle mass and tire stiffness having relatively little influence. The motion of the body mass at the bounce frequency is normally large compared to that of the axle.

In order to best provide for human comfort, it is desirable for the suspension spring to have a low bounce natural frequency. A suspension bounce frequency of one cycle per second (Hz) is often considered ideal in this regard. Actual suspensions often have higher bounce natural frequencies, dictated by the need to have sufficient spring stiffness to limit the change in vehicle height or attitude when the vehicle load changes, or to limit body pitch under braking and acceleration forces.

The second natural frequency is referred to as the axle-hop frequency and is characterized by the out-of-phase motion of the axle 11 with respect to the body 12. The axle-hop frequency is normally much higher than the bounce frequency, typically falling in the 10 to 12 Hz range for most modern cars and trucks. The amplitude of the axle motion will be large compared to that of the body at this resonant frequency. The axle-hop frequency is mostly a function of the tire stiffness, suspension stiffness, and axle mass and is influenced much less by the body mass.

A primary objective of a suspension system is to minimize the transmission of road disturbances to the vehicle chassis and its occupants The role of damping is essential in achieving this objective.

Figure 2:
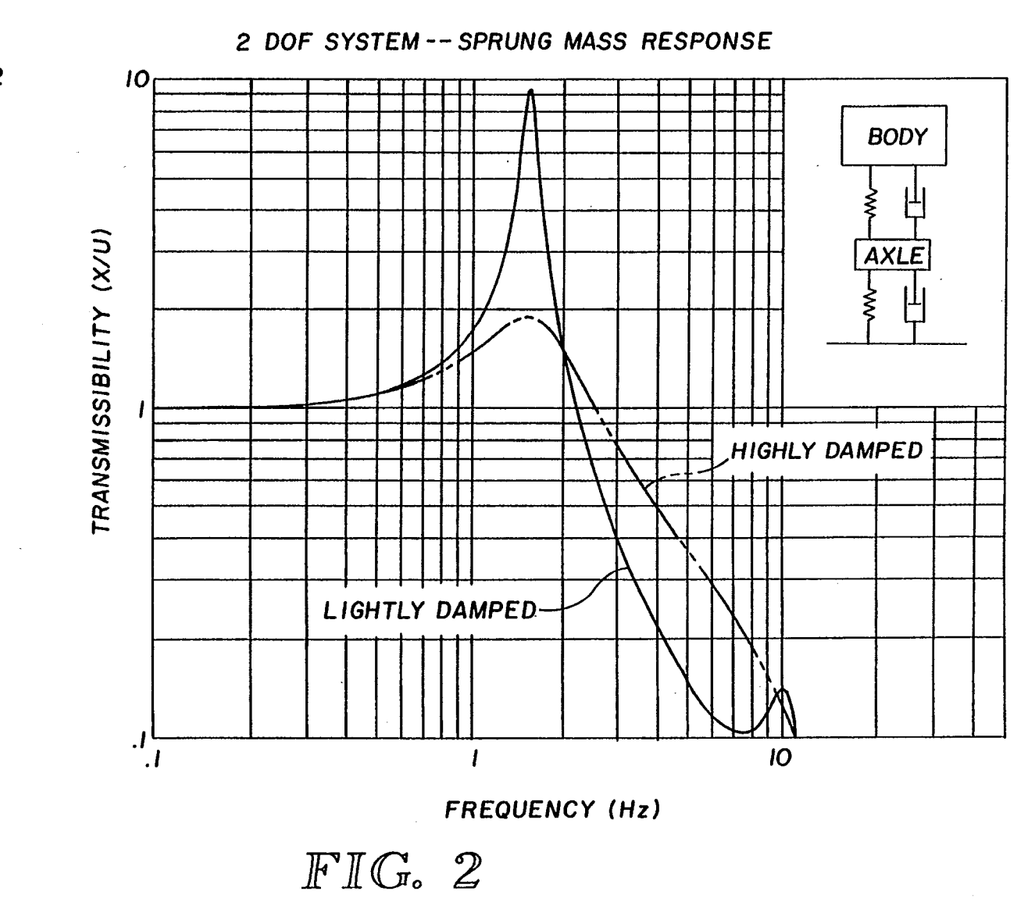
FIG. 2 is a frequency response graph for the suspension system of FIG. 1.

FIG. 2 shows the frequency response for a suspension having a bounce frequency of around 1.5 Hz and an axle-hop frequency near 10 Hz for two different levels of damping. The curves represent the transmissibility of the suspension, i.e., the ratio of the response amplitude of the body 12 to the input amplitude at the tire 18. A transmissibility greater than one indicates the input motion is amplified; less than one indicates attenuation. While increased damping provides reduced transmissibility of inputs at the two natural frequencies, it also results in poorer isolation of the body at intermediate frequencies and frequencies above the axle-hop frequency Good suspension isolation in the range of 5 to 9 Hz is particularly important for large highway trucks since such trucks typically have a frame flexure mode in that vicinity that is easily excited by road inputs and tire non-uniformities.

The foregoing discussion and principles are known to those skilled in the art of suspension design and vehicle dynamics. It is illustrative of the fact that damping is required primarily to control motion at the suspension's resonant frequencies, but is otherwise detrimental to ride performance.

Shock absorbers are not frequency-dependent devices. The force generated by a shock absorber is normally a function only of its piston velocity. The valving may be tailored to provide nearly linear performance or highly non-linear force vs. velocity characteristics, but the damping force generated at one frequency will be the same as is generated at another frequency given the same imposed velocity.

It would be advantageous to have a damping means that is frequency-dependent, that is, one which would provide a large amount of damping at the suspension's two resonant frequencies, thus attenuating the amplification of motion at those frequencies, but which would provide relatively little damping at other frequencies.

The amount of damping in a system is normally expressed in terms of a given fraction of critical damping. Critical damping is the minimum amount of damping needed to make the transient response of a spring/mass system non-oscillatory. Critical damping for a simple spring/mass system is given by:

$$C_c = 2\sqrt{km} \tag{1}$$

where k is the spring rate and m is the mass.

Most automotive suspensions have dampers which provide some fraction of critical damping which the designer feels provides the best ride qualities. Twenty to thirty percent of critical damping is typical.

The critical damping for a system varies with the square root of both the mass and the spring stiffness. In many vehicles, such as automobiles, the range of loading is relatively small. The mass carried by the suspension might increase by, at most, 40% between a lightly loaded and a fully loaded condition. The springs, which are usually steel leaf or helical coil, also have a nearly constant spring rate. So, the amount of damping required to maintain a fixed percentage of critical damping max, only vary by 18% or so. Consequently, this type of vehicle generally does not need adjustable dampers to provide satisfactory ride performance over its normal range of loading.

A large highway tractor with an air suspension is a quite different situation. The load on the tractor's tandem suspension with an empty trailer is only about one-third the load in the fully laden condition. If the tractor is bobtail (no trailer), the load may only be one-tenth of the full load. In addition, the spring rate of an air suspension is approximately proportional to the load being supported, so k in Equation 1 changes with load as well as does m. Thus, if the load changes by a factor of three, the critical damping for the system also changes by a factor of three. If the suspension dampers are sized for the fully loaded condition, then the suspension will have too much damping when lightly loaded and a harsh ride will result. Conversely, if the dampers are sized for good ride quality in the light condition, they will not provide sufficient control under heavy loads. Therefore, it would be very desirable to have the damping on truck air suspensions be load-dependent.

Figure 3:
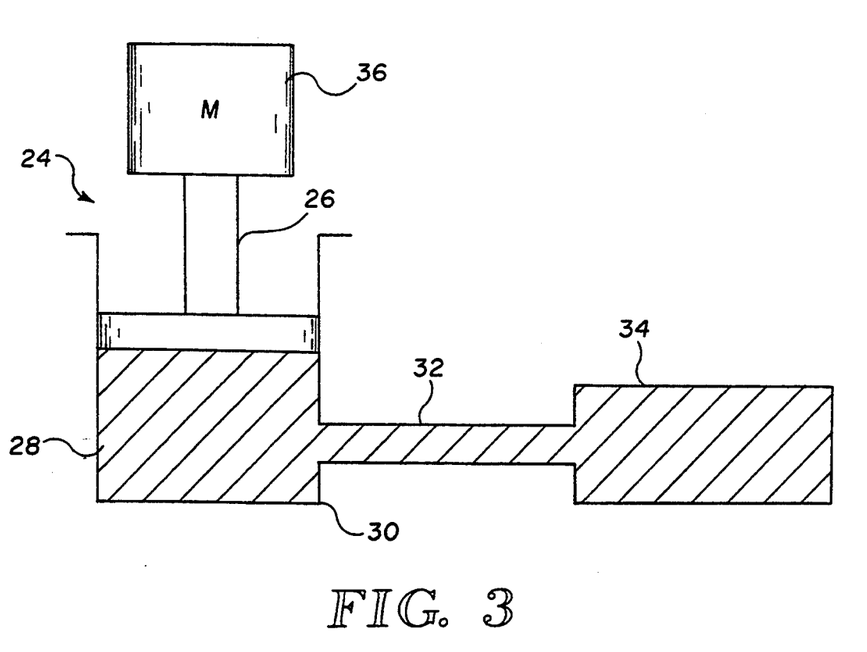
FIG. 3 is a block diagram showing a pneumatically damped spring of the prior art.

The basic concept of a pneumatically damped airspring is illustrated in FIG. 3. An airspring 24 of constant effective area is represented by a piston 26 supported by pressurized air 28 contained within a cylinder 30. A conduit 32 connects the air volume in the spring to a secondary air chamber 34. The airspring 24 supports a single mass 36.

The spring rate of a constant area airspring is given by the relation:

$$k = \frac{npA^2}{v} \quad (2)$$

where
A = the piston area
p = the absolute air pressure
v = the air volume
n = the polytropic gas constant.

If the conduit is very large, so that air may flow freely between the spring and secondary air chamber, then the effective air volume is essentially the total of the spring and chamber volumes. Since the spring rate is inversely proportional to the spring volume, this yields a relatively low spring rate. The frequency response of the system with a very large conduit 32 is indicated by curve B in FIG. 4

On the other hand, if the conduit is very small, so that little air may pass between the spring and the secondary chamber, the effective volume will be essentially that of the spring alone. The response of this system with a very small conduit 32 is indicated by curve A in FIG. 4. The higher natural frequency reflects the higher spring rate due to the smaller effective air volume. As with the large conduit, the response is essentially undamped.

Figure 4:
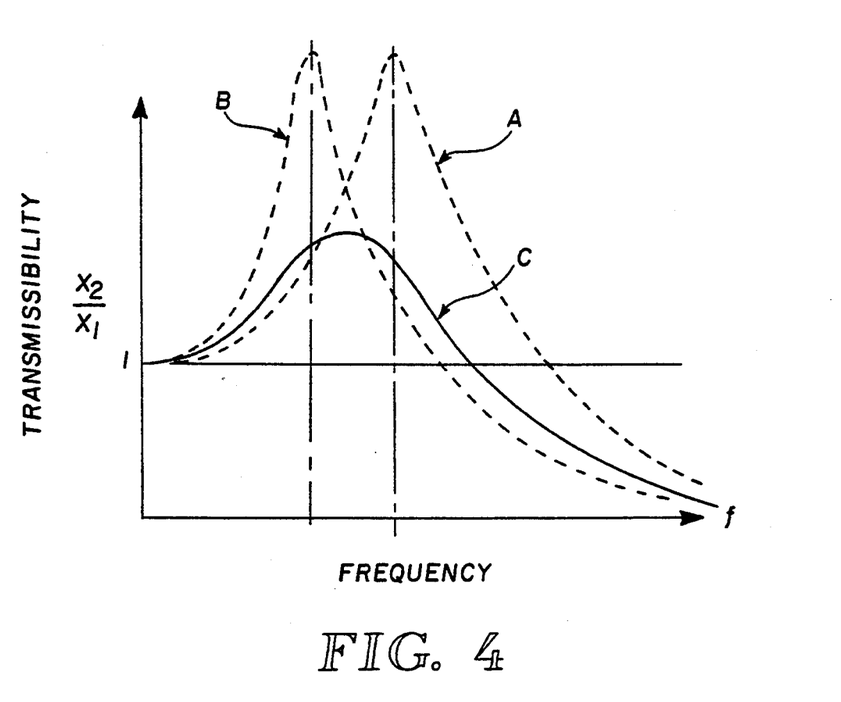
FIG. 4 is a frequency response graph for the spring of FIG. 3.

If the conduit 32 is sized appropriately, however, the response shown in curve C of FIG. 4 can be achieved. The effective volume of the spring lies somewhere between the two extremes indicated by curves A and B and results in an intermediate natural frequency. In addition, the system now exhibits a certain amount of damping.

The damping is the result of pumping energy losses in the conduit 32. If the conduit is too small, the air flow rate is insufficient to generate significant energy loss. Conversely, if the conduit is too large, the pressure drop across it is too small to generate significant energy loss. The diameter and length of the conduit will determine the frequency at which peak damping occurs, while the volume of the secondary chamber 34 generally governs how much damping can be achieved. The larger the secondary volume, the greater the damping that can be achieved. A larger volume tends to maintain a larger pressure differential between the airspring and the reservoir as the airspring 24 cycles.

While conceptually simple, the gas dynamics of air damping are complex. The problem does not lend itself readily to analytical treatment, and tuning of an air damping circuit is best accomplished through empirical methods.

An important characteristic of the system of FIG. 3 is that the energy dissipation is a function of frequency. For a given level of damping at resonance, a pneumatically-damped airspring will have high-frequency isolation performance superior to that of a linear viscously damped system, since it provides reduced damping off-resonance where damping degrades isolation performance.

A second characteristic of the system of FIG. 3 is that the amount of damping generated varies with the nominal pressure in the system. For a given displacement of the mass, the pressure differential across the conduit will increase as the system pressure increases. The higher pressure drop results in greater pumping losses and hence, increased damping. Since the pressure in the airspring is proportional to the load being supported, the damping therefore tends to be load-dependent.

The system of FIG. 3 is a single degree of freedom system with only one natural frequency and is not an appropriate solution for a vehicle suspension where there are two resonant frequencies to control. If the system is tuned for the, suspension bounce frequency, then almost no damping is provided at the axle-hop frequency. Likewise, if the system is tuned for axle-hop control, too little damping exists at the bounce frequency.

SUMMARY OF THE INVENTION

The present invention is directed to a pneumatically damped vehicle suspension system for use with highway trucks and trailers. The suspension system does not depend on hydraulic shock absorbers and provides damping that is both load-dependent and frequency-dependent.

The present invention overcomes the disadvantages of the prior an by providing maximum damping at the axle-hop and bounce frequencies of a vehicle suspension system and minimal damping at other frequencies. Such frequency-dependent damping is provided by two pneumatic damping circuits, one tuned to the axle-hop frequency and one tuned to the bounce frequency. Each damping circuit includes a pneumatic chamber connected to a pneumatic spring by a conduit. Preferably, in the high-frequency circuit that maximally damps motion at the axle-hop frequency, a second pneumatic spring provides the pneumatic chamber for the first pneumatic spring, The preferred embodiment of the present invention includes a pneumatic spring positioned at each end of the two axles of a tandem axle suspension. A large diameter, high-frequency conduit connects each rear spring with one of the front springs. A plurality of small diameter, low-frequency conduits connects each spring with one or more pneumatic chambers. The high-frequency conduits provide maximum damping at an axle-hop resonant frequency. The low-frequency conduits provide maximum damping at a bounce resonant frequency. At frequencies other than the bounce and axle-hop frequencies, damping is minimized to provide maximum comfort to the user of the vehicle.

DETAILED DESCRIPTION OF THE INVENTION

The present invention is directed to a suspension system for pneumatically damping the motions found on highway vehicles such as tracks and trailers. A pneumatic spring supporting a vehicle frame on an axle is connected to two pneumatic chambers by two conduits. One conduit is of large diameter to provide maximum damping at the vehicle axle-hop frequency. The second conduit is a small diameter, low-frequency conduit that provides maximum damping at the vehicle bounce frequency. In a preferred embodiment, the chamber connected by the large diameter conduit is part of a second pneumatic spring that supports the vehicle frame on a second axle.

Figure 5:
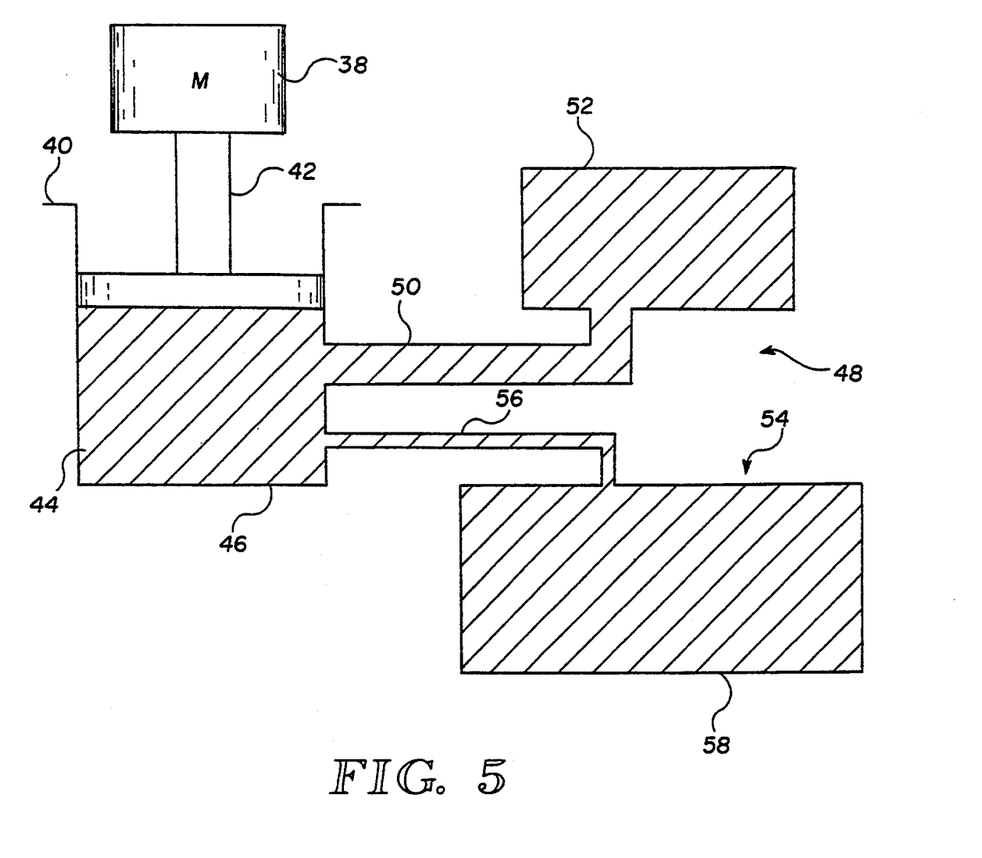
FIG. 5 is a block diagram of a two-frequency pneumatically damped spring according to the present invention.

As shown in FIG. 5, damping at two frequencies can be achieved by providing two independent damping circuits. A mass 38 is supported by a pneumatic spring 40 that includes a piston 42 supported by pressurized gas 44 contained within a chamber 46. A first damping circuit 48 includes a large conduit 50 connecting a small secondary chamber 52 to the spring chamber 46. A second damping circuit 54 includes a small conduit 56 connecting a large secondary chamber 58 to the spring chamber 46.

The smaller conduit 56 is used to control the bounce frequency, and the larger conduit 50 is used to control the axle-hop frequency. At the axle-hop frequency, little air is transmitted through the smaller conduit 56 and the secondary chamber 58 to which it is connected is essentially shut-off from the airspring. At the bounce frequency, the large conduit 50 allows air to pass freely, so the small secondary chamber 52 acts as part of the airspring volume. This in turn requires an even larger secondary chamber 58 in the low-frequency damping circuit 54 to achieve a high enough volume ratio to produce significant damping. This not only creates packaging problems on a vehicle, but results in such a large total volume that the static spring rate becomes very low. The consequence of a very large total volume is very large suspension excursions during quasi-static maneuvers such as braking and acceleration.

A preferred embodiment of the present invention avoids the difficulties described above and provides a practical scheme for pneumatically damping a tandem axle pneumatic suspension. The embodiment provides damping at both the suspension bounce frequency and at the axle-hop frequency. Further, adequate damping is achieved at both bounce and axle-hop frequencies without the effective volume of either secondary chamber exceeding the volume in the airspring chamber.

Figure 6:
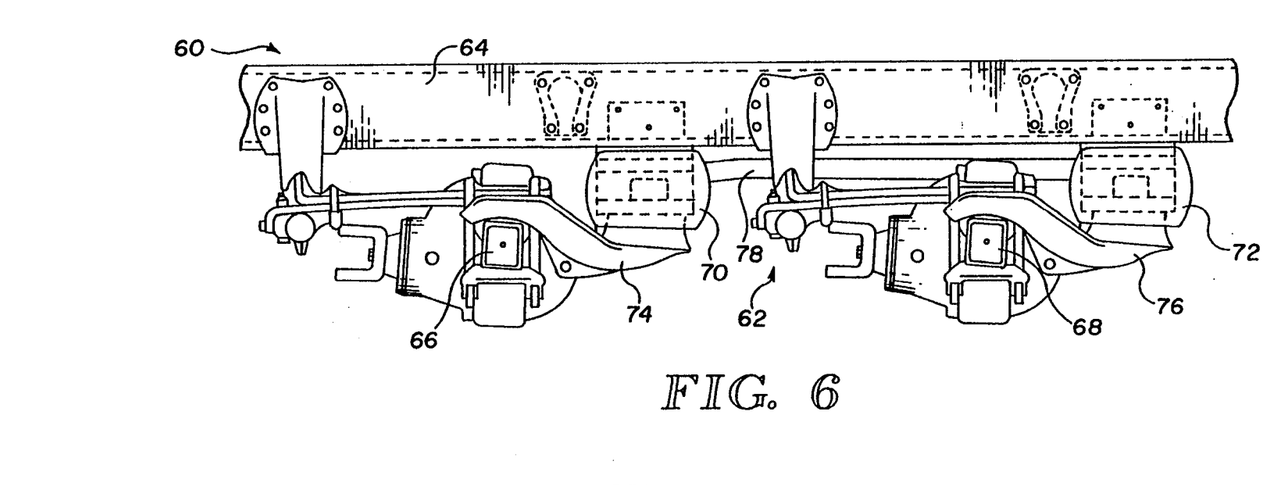
FIG. 6 is a side elevational view of a suspension system according to the present invention.

Truck tandem air suspensions come in a variety of configurations. FIG. 6 shows a trailing arm design which has been modified according to the present invention. FIG. 6 shows a left side of a tandem axle vehicle 60 having a suspension system 62 supporting a vehicle frame 64 on front and rear axles 66 and 68. The suspension system 62 includes front and rear pneumatic springs 70 and 72 connected to the frame 64. Each spring includes a gas chamber and a piston as shown in FIG. 5. The front pneumatic spring 70 is supported by the front axle 66 via a front support arm 74 connected between the spring and axle, while the rear pneumatic spring 72 is supported by the rear axle 68 via a rear support arm 76 connected between the spring and axle. A hose or conduit 78 connects the springs together to convey gas between the springs as discussed in more detail below with respect to FIG. 8. Of course, identical elements are located on the right side of the vehicle.

Figure 7:
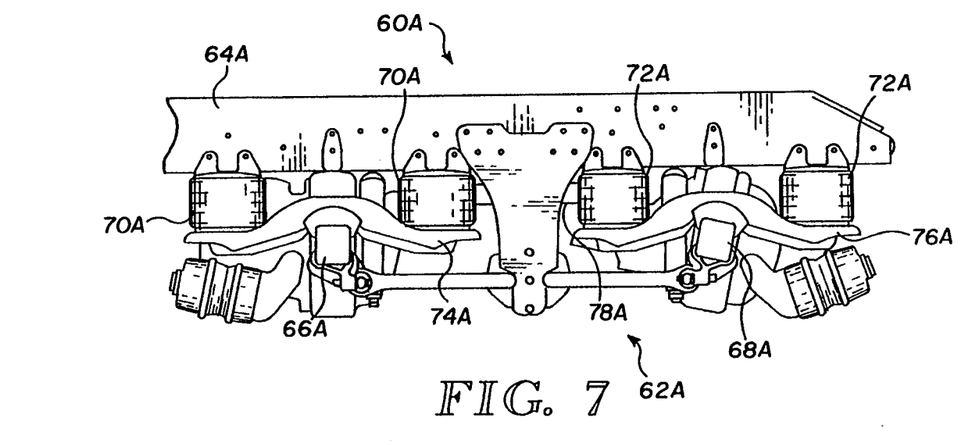
FIG. 7 is a side elevational view of an alternate suspension system according to the present invention.

FIG. 7 is similar to FIG. 6 in that FIG. 7 shows one side of a tandem axle vehicle 60A having a suspension system 62A supporting a vehicle frame 64A on front and rear axles 66A and 68A. The suspension system 62A includes front and rear pneumatic springs 70A and 72A connected to the frame 64A. Each spring includes a gas chamber and a piston as shown in FIG. 5. The front pneumatic springs 70A are supported by the front axle 66A via a front support arm 74A connected between the springs and axle, while the rear pneumatic springs 72A are supported by the rear axle 68A via a rear support arm 76A connected between the springs and axle. A hose or conduit 78A connects the springs together to convey gas between the springs as discussed in more detail below with respect to FIG. 8. The conduit 78A includes connecting conduits (not shown) to each of the four springs 70A, 70B on the side of the vehicle shown. The connecting conduits allow the front springs 70A to act as a single unit like the front spring 70 (FIG. 6) and allow the rear springs 72A to operate as a single unit like the rear spring 72 (FIG. 6). Of course, identical elements are located on the right side of the vehicle.

Figure 8:
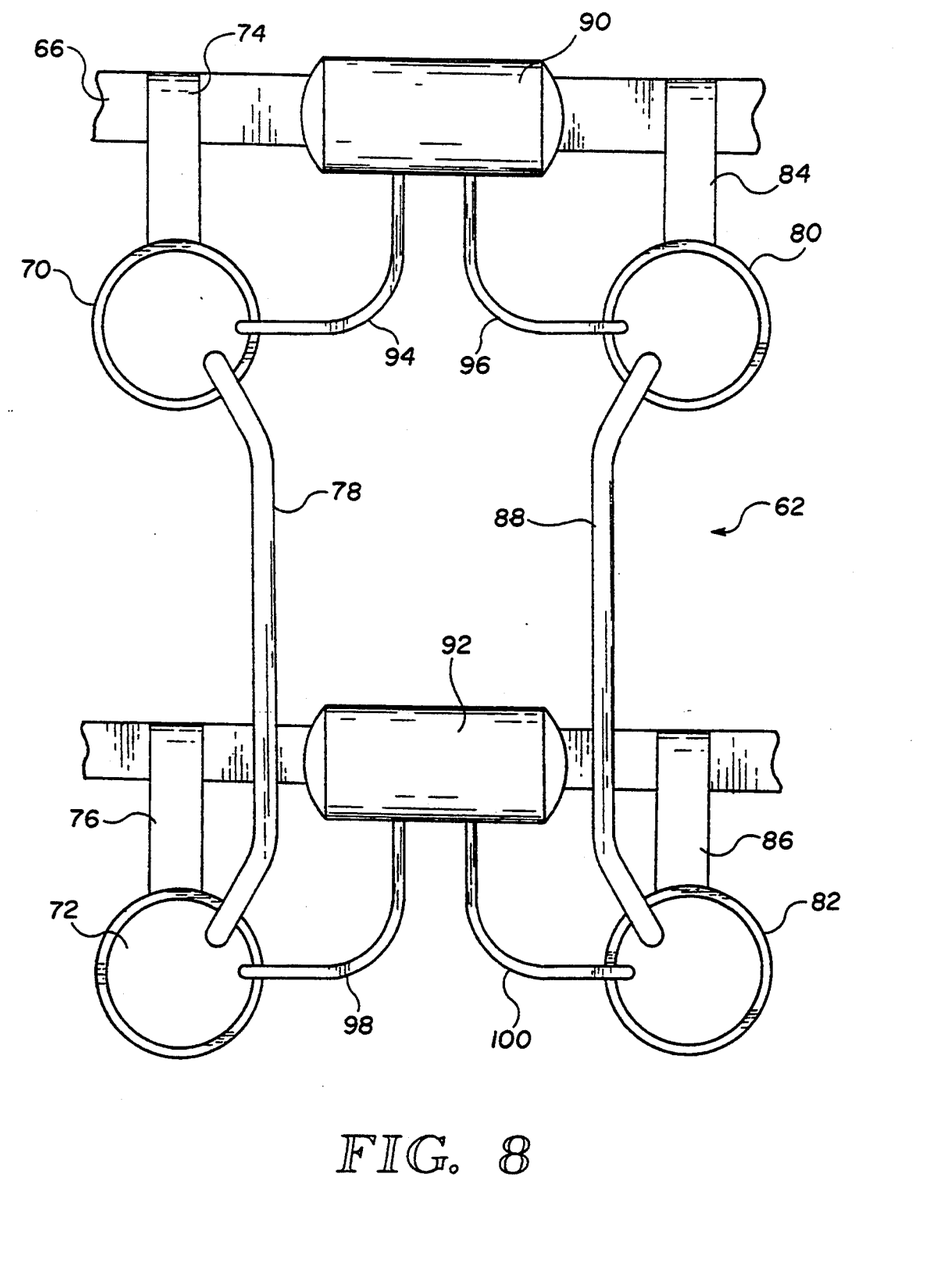
FIG. 8 is a plan view of the suspension system of FIG. 6

FIG. 8 is a plan view of the suspension system shown in FIG. 6. Because the front and rear springs shown in FIG. 7 each operate as a single unit. FIG. 8 can be considered a schematic diagram of the suspension system 62A of FIG. 7. Of the items shown in FIG. 6, only the axles 66 and 68, springs 7C, and 72, support arms 74 and 76, and conduit 78 are depicted in FIG. 8, since other details of the suspension system are not relevant to the operation of the system. Like the left side shown in FIG. 6, the suspension system 62 includes right front and right rear pneumatic springs 80 and 82. The front spring 80 is supported by the front axle 66 via a front support arm 84, while the rear spring 82 is supported by the rear axle 68 via a rear support arm 86. A hose or conduit 88 connects the springs 80 and 82 together to convey gas between the springs.

The suspension system 62 includes front and rear pneumatic chambers 90 and 92 which provide supplies of gas for the front and rear springs, respectively Conduits 94 and 96 connect the front left spring 70 and the front right spring 80 to the front chamber 90. Likewise, conduits 98 and 100 connect the rear left spring 72 and the rear right spring 82 to the rear chamber 92. The conduits 94, 96, 98, and 103 are of similar size, with each having a diameter and length that are tuned to provide maximum damping at the suspension bounce natural frequency.

As discussed above, conduits 78 and 88 are connected between the forward and rear springs on each side of the vehicle. These may be plumbed to the springs on the same side of the vehicle, as shown in FIG. 8, or cross-connected to the opposite side. These conduits have a greater diameter than the conduits connected to the pneumatic chambers 90 and 92 to provide a maximum amount of damping at the axle-hop natural frequency.

At the bounce frequency, the frame and the axles move in-phase, and approximately equal deflections of the four airsprings are imposed. Thus, little air transfer occurs through the high-frequency damping conduits 78 and 88 and the system natural frequency is unaffected by the presence of the high-frequency conduits.

At the axle-hop frequency, the amplitude of the motion of the axles 66 and 68 is large compared to that of the frame 64. There is no intrinsic phase relationship between the two axles in the tandem, since there is no linkage between the axles except for the aforementioned air conduits, i.e., motion of one axle is not constrained in any way by the other axle. If the two axles do not move in-phase, at the same amplitude, air will be transferred between airsprings through the large-diameter, high-frequency conduits 78 and 88. It is conceivable that both axles could resonate at the axle-hop frequency in-phase resulting in no air transfer between springs and therefore no damping. In practice, however, a phase relationship is imposed. The normal spacing between the axles in a tandem is 52 inches (4.33 feet). At a normal highway cruising speed of 60 miles per hour (88 feet/second), the time lag between when the lead axle in the tandem encounters a disturbance in the road surface and when the trailing axle encounters the same disturbance is 0.05 seconds. This is exactly the half-period of a typical 10 Hz axle-hop frequency. Thus, the disturbance tends to excite the rear axle 68 in the tandem almost exactly 180 degrees out-of-phase with the front axle 66. The out-of-phase motion between the two axles results in maximum air transfer between springs through the high-frequency damping lines and consequent damping of the axle-hop mode.

The arrangement and sizing of the components depends on the specifics of the suspension hardware and the suspension's natural frequencies. Those parameters are best determined empirically. The embodiment which served as the development platform for this concept had the following specifications:

Airspring volume at mid-ride height = 825 in$^3$
Pneumatic chambers volume/spring = 787 in$^3$
Low-frequency damping conduits diameter = 0.37 in ID
Low-frequency damping conduits length = 40 in.
High-frequency damping conduits diameter = 1.12 in ID
High-frequency damping conduits length = 95 in.

Other suspensions employing different airsprings, geometries, and physical properties would be tuned differently, but the fundamental concepts described herein would apply equally well.

Figure 9:
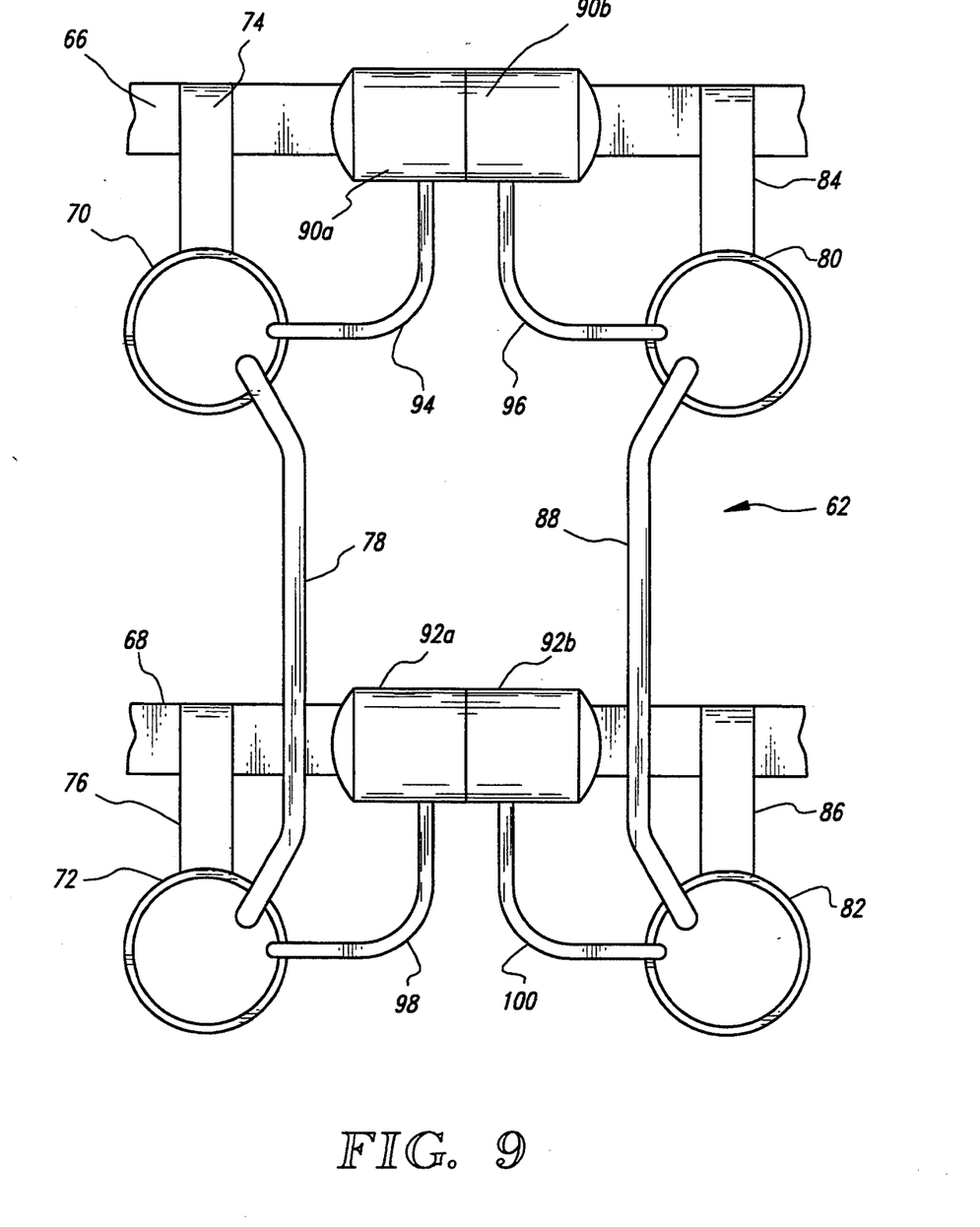
FIG. 9 is a plan view of a second alternate suspension system according to the present invention.
Figure 10:
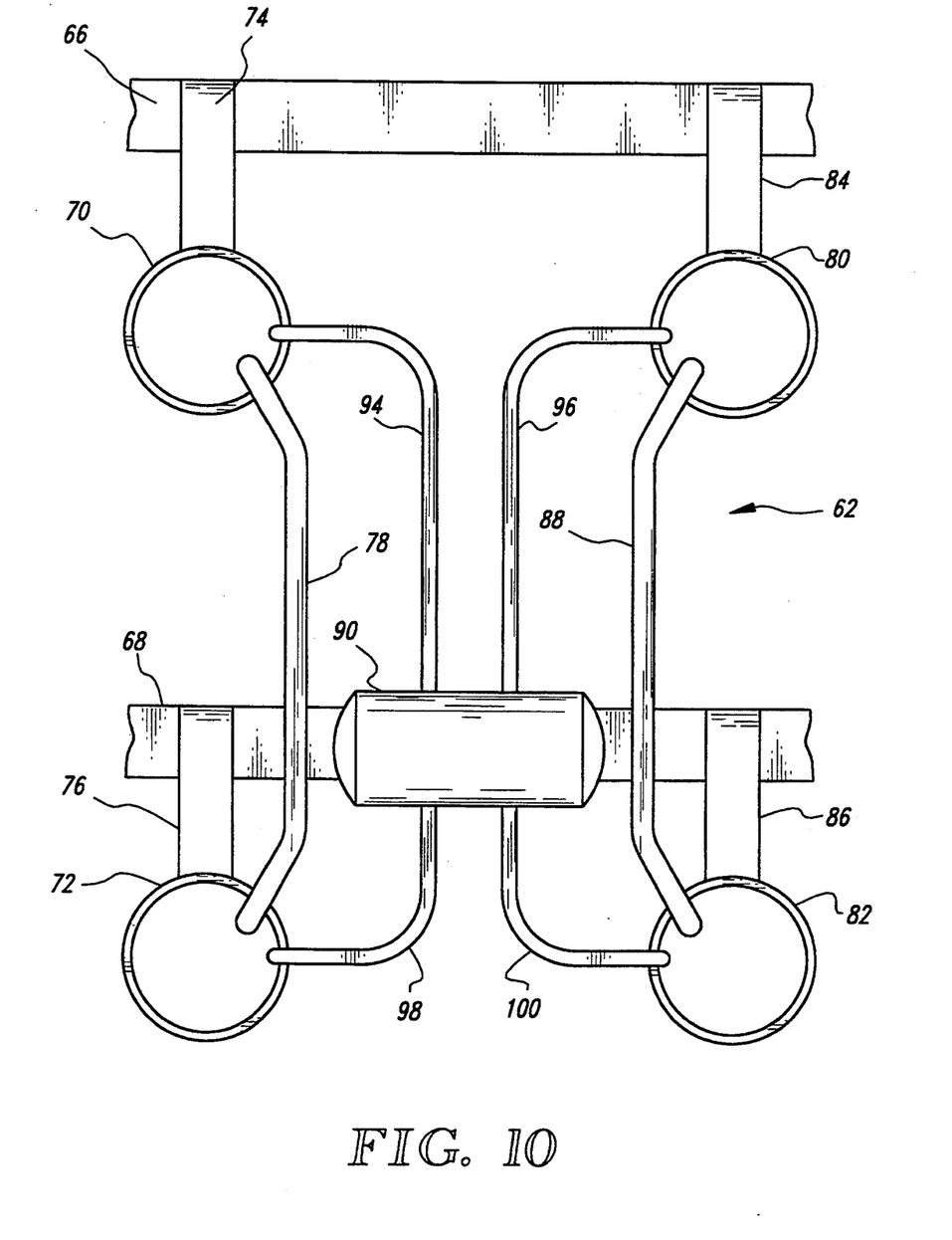
FIG. 10 is a plan view of a third alternate suspension system according to the present invention.

In the embodiment shown in FIG. 8 one pneumatic chamber 90 or 92 is provided for the pneumatic springs for each axle. In an alternate embodiment, a separate chamber is used for each spring, as shown in FIG. 9. In another alternate embodiment, all four springs share a single chamber as shown in FIG. 10. As long as the chambers and conduits are tuned to provide maximum damping at the bounce frequency, the number of chambers need not be limited.

A similar suspension system 62A is used for the eight pneumatic spring embodiment shown in FIG. 7. Each spring can be connected to a single pneumatic chamber via small, low-frequency conduits or eight or more pneumatic chambers can be used. The small diameter conduits used for any arrangement should be of a diameter and length to provide maximum damping at the bounce frequency. Large-diameter, high-frequency conduits 78A and 88A, similar to the large-diameter conduits 78 and 88 shown in FIG. 8, are provided and tuned to provide maximum damping at the axle-hop frequency.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:
1. A pneumatic suspension system for a vehicle having a frame, the suspension system supporting the frame and having a first axle, comprising:
   a first pneumatic spring supported by a first end of the first axle;
   a first pneumatic chamber;
   a second pneumatic chamber;
   a first damping means functionally connecting the pneumatic spring to the first pneumatic chamber for providing maximum damping at a first frequency;
   a second damping means functionally connecting the pneumatic spring to the second pneumatic chamber for providing maximum damping at a second frequency that is higher than the first frequency:
   a second pneumatic spring supported by a second end of the first axle;
   a third pneumatic chamber;
   a third damping means functionally connecting the second pneumatic spring to the third pneumatic chamber for providing maximum damping substantially at the first frequency;
   a third pneumatic spring supported by a second axle of the vehicle, the second pneumatic chamber being part of the third pneumatic spring;

a fourth pneumatic spring supported by the second axle; and a fourth damping means functionally connecting the fourth pneumatic spring to the second pneumatic spring for providing maximum damping substantially at the second frequency.

2. The pneumatic suspension system of claim 1 wherein the first and third pneumatic springs are positioned on a first side of the vehicle and the second and fourth pneumatic springs are positioned on a second side of the vehicle.

3. The pneumatic suspension system of claim 1, further including:

a fourth pneumatic chamber;

a fifth pneumatic chamber;

a fifth damping means functionally connecting the fourth pneumatic spring to the fourth pneumatic chamber for providing maximum damping substantially at the first frequency; and a sixth damping means functionally connecting the third pneumatic spring to the fifth pneumatic chamber for providing maximum damping substantially at the first frequency.

4. A pneumatic suspension system for a vehicle having a frame, the suspension system supporting the frame and having a first axle, comprising:

a first pneumatic spring supported by the first axle;

a first pneumatic chamber;

a second pneumatic chamber;

a first damping means functionally connecting the pneumatic spring to the first pneumatic chamber for providing maximum damping at a first frequency;

a second damping means functionally connecting the pneumatic second pneumatic chamber for providing maximum damping at a second frequency that is higher than the first frequency;

a second pneumatic spring supported by the first axle; and a third damping means functionally connecting the second pneumatic spring to the first pneumatic chamber for providing maximum damping substantially at the first frequency.

5. The pneumatic suspension system of claim 4 wherein the first pneumatic spring is supported by a first end of the first axle and the second pneumatic spring is supported by a second end of the first axle.

6. The pneumatic suspension system of claim 5, further including:

a third pneumatic spring supported by a second axle of the vehicle, the second pneumatic chamber being part of the third pneumatic spring;

a fourth pneumatic spring supported by the second axle; and a fourth damping means functionally connecting the fourth pneumatic spring to the second pneumatic spring for providing maximum damping substantially at the second frequency.

7. The pneumatic suspension system of claim 6 wherein the first and third pneumatic springs are positioned on a first side of the vehicle and the second and/fourth pneumatic springs are positioned on a second side of the vehicle.

8. The pneumatic suspension system of claim 6, further including:

a fifth damping means functionally connecting the fourth pneumatic spring to the first pneumatic chamber for providing maximum damping substantially at the first frequency; and a sixth damping means functionally connecting the third pneumatic spring to the first pneumatic chamber for providing maximum damping substantially at the first frequency.

9. The pneumatic suspension system of claim 7, further including:

a third pneumatic chamber;

a fifth damping means functionally connecting the fourth pneumatic spring to the third pneumatic chamber for providing maximum damping substantially at the first frequency; and a functionally connecting the third pneumatic spring to the third pneumatic chamber for providing maximum damping substantially at the first frequency.

10. A pneumatic suspension system for supporting a vehicle frame on first and second axles, comprising:

a first pneumatic spring supported by the first axle;

a second pneumatic spring supported by the second axle;

a first pneumatic chamber;

a first damping means functionally connecting the first pneumatic spring to the first pneumatic chamber for providing maximum damping at a first frequency; and a second damping means functionally connecting the first pneumatic spring to the second pneumatic spring for providing maximum damping at a second frequency that is greater than the first frequency.

11. The pneumatic suspension system of claim 10, wherein the first damping means includes a first conduit having a diameter and length that provide maximum damping at a vehicle bounce frequency and the second damping means includes a second conduit having a diameter and length that provide maximum damping at a vehicle axle-hop frequency.

12. The pneumatic suspension system of claim 10, further including:

a third damping means functionally connecting the second pneumatic spring to the first pneumatic chamber for providing maximum damping substantially at the first frequency.

13. The pneumatic suspension system of claim 10, further including:

a second pneumatic chamber; and a third damping means functionally connecting the second pneumatic spring to the second pneumatic chamber for providing maximum damping substantially at the first frequency.

14. The pneumatic suspension system of claim 10, further including:

a third pneumatic spring supported by the first axle; and a third damping means functionally connecting the third pneumatic spring to the first pneumatic chamber for providing maximum damping substantially at the first frequency.

15. The pneumatic suspension system of claim 14 wherein the first pneumatic spring is supported by a first end of the first axle and the third pneumatic spring is supported by a second end of the first axle.

16. The pneumatic suspension system of claim 15, further including:

a fourth pneumatic spring supported by the second axle; and a fourth damping means functionally connecting the fourth pneumatic spring to the third pneumatic spring for providing maximum damping substantially at the second frequency.

17. The pneumatic suspension system of claim 16 wherein the first and second pneumatic springs are positioned on a first side of the vehicle and the third and fourth pneumatic springs are positioned on a second side of the vehicle.

18. The pneumatic suspension system of claim 16, further including:
a fifth damping means functionally connecting the fourth pneumatic spring to the first pneumatic chamber for providing maximum damping substantially at the first frequency; and
a sixth damping means functionally connecting the second pneumatic spring to the first pneumatic chamber for providing maximum damping substantially at the first frequency.

19. The pneumatic suspension system of claim 16, further including:
a second pneumatic chamber;
a fifth damping means functionally connecting the fourth pneumatic spring to the second pneumatic chamber for providing maximum damping substantially at the first frequency; and
a sixth damping means functionally connecting the second pneumatic spring to the second pneumatic chamber for providing maximum damping substantially at the first frequency.

* * * * *

UNITED STATES PATENT AND TRADEMARK OFFICE
CERTIFICATE OF CORRECTION

PATENT NO. : 5,374,077

DATED : December 20, 1994

INVENTOR(S) : Roger P. Penzotti and Donald L. Stephens

It is certified that error appears in the above-identified patent and that said Letters Patent is hereby corrected as shown below:

In column 9, claim 4, line 36, after "pneumatic" and before "second", please insert --spring to the--.

Signed and Sealed this

Twenty-seventh Day of June, 1995

Attest:

BRUCE LEHMAN

Attesting Officer

Commissioner of Patents and Trademarks